Aug. 11, 1942.    B. WATSON    2,292,679
ROTARY BEATER
Filed July 22, 1940

INVENTOR:
BERYL WATSON
BY
ATTORNEYS.

Patented Aug. 11, 1942

2,292,679

UNITED STATES PATENT OFFICE 2,292,679

ROTARY BEATER

Beryl Watson, Davenport, Iowa, assignor to Deere & Company, Moline, Ill., a corporation of Illinois Application July 22, 1940, Serial No. 346,715

7 Claims. (Cl. 130—22)

The present invention relates generally to agricultural machines and more particularly to rotary beaters of the type commonly used in threshing mechanism, with particular reference to the beater or separating cylinder which is commonly provided behind the threshing cylinder for stripping straw or other harvested material from the threshing cylinder and passing it rearwardly upon the separating mechanism, although I do not intend my invention to be limited to this particular unit. Separating cylinders or rotary beaters of this type are generally provided with a plurality of radially outwardly extending spikes or teeth which engage the straw or vines tending to adhere to the threshing cylinder, for the purpose of stripping such harvested material therefrom. Although most crops require the aggressive stripping action provided by such spikes or teeth, there are other crops which are not as successfully handled by this type of a beater because of their inherent tendency to wrap around and cling to the teeth or spikes and are not readily detached therefrom by the centrifugal action of the rotating cylinder, but require the machine to be shut down more or less frequently for the purpose of dislodging and cleaning the harvested material from the separating cylinder. This operation must be done by hand and under certain conditions results in a considerable amount of lost time.

It is the principal object, therefore, of the present invention, to provide a beater with detachable shielding means for covering the teeth or spikes for use under such crop conditions in which the harvested material tends to cling to the teeth, but which can be removed when the machine is operating under more normal crop conditions and where maximum aggressive action is necessary.

These and other objects and advantages of my invention will be apparent after a consideration of the following description in which reference is had to the drawing appended hereto, in which Figure 1 is a diagrammatic elevational view of a threshing mechanism showing a separating cylinder or rotary beater in which the stripping teeth or spikes are bare for a maximum aggressive stripping action;

Figure 1:
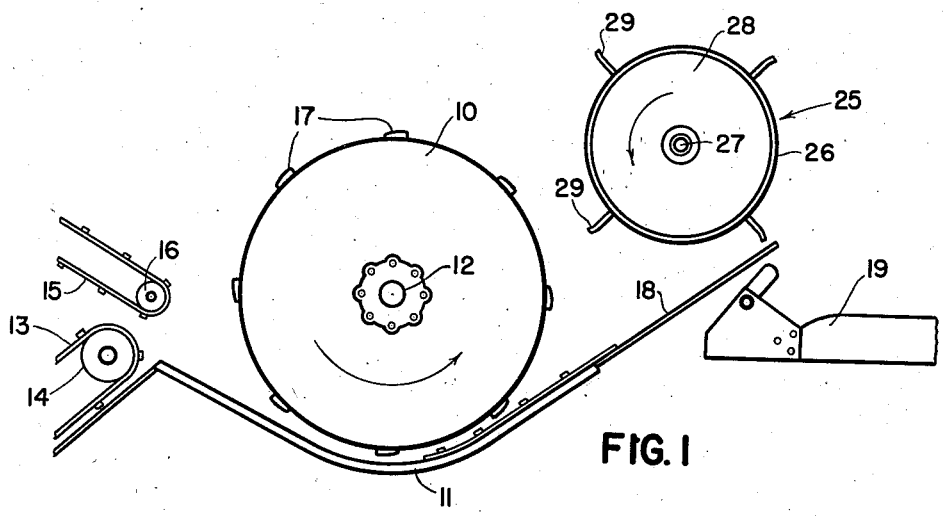
Figure 2:
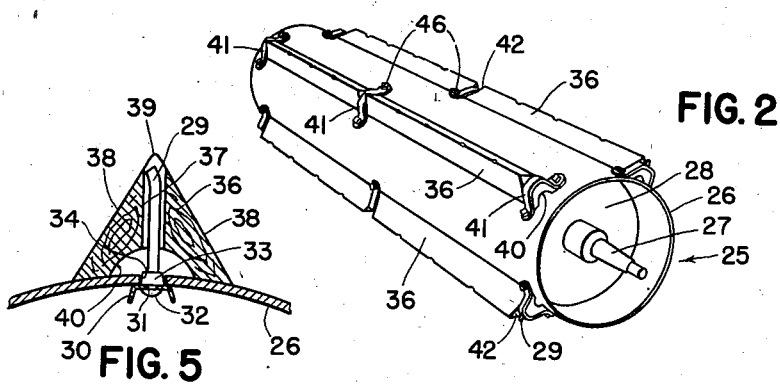
Figure 2 is a perspective view of a rotary beater in which the stripping teeth are shielded according to the principles of the present invention to prevent wrapping of the harvested material.

Referring now to the drawing, the threshing mechanism comprises a conventional threshing cylinder 10 and threshing concave 11 disposed in cooperative threshing relation thereto. The threshing cylinder 10 is rotatively mounted on a supporting shaft 12 which is carried in suitable bearings (not shown). The crop is fed to the threshing cylinder upon an endless conveyor 13 of any suitable design, which is trained around a roller 14. An upper conveyor 15 trained around a roller 16 assists in feeding the harvested material to the threshing cylinder 10. The grain is threshed from the straw by the action of threshing bars 17 of the threshing cylinder 10 after which the grain and straw are thrown rearwardly over the grate 18 upon the straw rack 19 which functions in a conventional manner in separating the grain from the straw. Behind the threshing cylinder 10 and above the grate 18 is disposed a separating cylinder or rotary beater 25, comprising a sheet metal cylinder 26 carried on a suitable supporting shaft 27 by means of suitable spiders 28. The supporting shaft 27 is journaled in suitable bearings (not shown) and the beater is driven in the same direction of rotation as that of the threshing cylinder 10.

Figure 5:
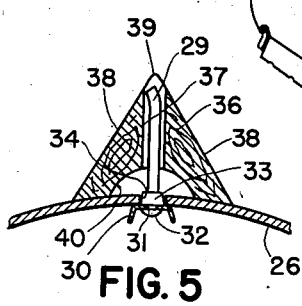
Figure 5 is a sectional elevation taken along a line 5—5 in Figure 4.
Figures 3, 4:
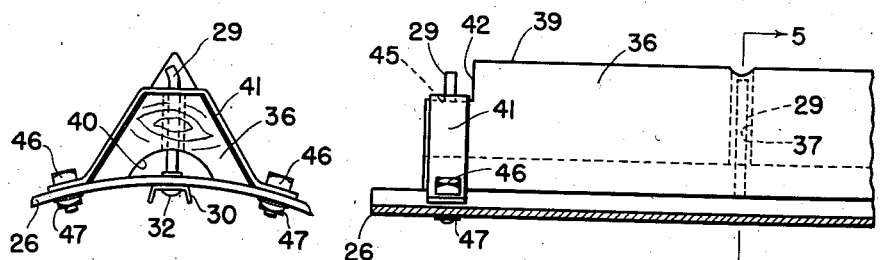
Figure 3 is a fragmentary view of one end of the beater drawn to an enlarged scale and showing the details of one of the shielding bars and its means for attaching to the cylinder.
Figure 4 is a fragmentary side view of one of the shielding bars.

The rotary beater 25 is provided with a plurality of radially outwardly extending teeth or spikes 29 arranged in a plurality of axially extending circumferentially spaced rows on the surface of the cylinder 26. Each of the rows of teeth 29 is supported on a structural channel member 30 which is fixed by any suitable means, such as rivets or welding, to the inner surfaces of the sheet metal cylinder 26. The teeth 29 are rigidly fixed to the channel members 30 by inserting their inner ends through apertures 31 in the channel members and then riveting the inner ends of the teeth, as indicated at 32. Each tooth is provided with a collar or shoulder 33 formed integral therewith which abuts against the opposite surface of the channel 30. The sheet metal cylinder 26 is provided with apertures 34 through which the teeth 29 are inserted, the apertures being large enough to receive the integrally formed shoulders 33, as indicated in Figure 5.

The rotation of the threshing cylinder 10 and stripping cylinder 25 are such that the teeth 29 on the cylinder 25 move downwardly adjacent the upwardly moving threshing bars 17 on the threshing cylinder 10, thereby tending to strip straw and other harvested material from the threshing cylinder. As explained hereinbefore, under most crop conditions the centrifugal force of the stripping cylinder 25 is sufficient to throw the harvested material off the spikes 29 rearwardly over the separator 19, but under certain crop conditions the harvested material tends to cling to the teeth 29 and become wrapped thereon in such manner that the material is not thrown away from the stripping cylinder. In accordance with the principles of the present invention, to remedy this condition, I have provided a shielding member for each row of teeth in the form of a long bar 36, preferably made of wood of substantially triangular cross section. Each bar 36 is laid upon the cylinder 26 and generally parallel to the axis of rotation thereof, and is provided with a series of radially outwardly extending recesses or apertures 37 adapted to receive the several teeth 29. The triangular form of the bar 36 provides a pair of outwardly converging side surfaces 38, which intersect outwardly of the ends of the teeth 29 to form an outer edge 39 at the apex thereof, thus completely shielding the spikes and preventing wrapping of the harvested material thereon, while preserving a certain amount of stripping action for clearing the threshed material away from in back of the threshing cylinder. The under side of the shielding bar 36 is grooved, as at 40, to avoid interference with the shoulders 33 on the spikes 29.

The shielding bars 36 are secured to the sheet metal cylinder 26 by means of strap members 41 which straddle the bars at several axially spaced points on each bar. The outer edge of the bar 36 is notched to form recesses 42 through which the strap members 41 extend and these recesses 42 are located to register with certain of the apertures 37 through which certain of the teeth 29 project, thus exposing the outer ends of such teeth at these locations. The strap members 41 are apertured to receive the ends of the teeth and thus bracing the bars against movement in any direction on the surface of the cylinder. The ends of the strap members 41 are bent to lie flat upon the surface of the cylinder 26 and are apertured to receive securing bolts 46 which extend therethrough and through aligned apertures in the cylinder 26. Threaded nuts 47 are welded upon the inside surface of the cylinder at the bolt apertures and thus provide means for firmly securing the strap members to the cylinder, without the necessity of reaching into the cylinder to fit the nuts on the bolts during assembly.

The shielding bars 36 provide longitudinally extending ribs on the stripping cylinder, which have proved to be very effective in threshing certain crops such as, for example, soy beans and flax, for in such crops the ribs are sufficiently aggressive to clear the cylinder but provide no projection upon which the crop can wrap.

I claim:

1. Shielding means for a rotary beater comprising a shaft having a row of outwardly extending crop engaging teeth supported thereon, said means comprising an axially disposed narrow shield bar adapted to be detachably supported on said beater and apertured to receive said row of teeth for shielding the latter when working in certain crops to prevent wrapping of the stalks on said teeth, said bar projecting radially outwardly to serve as a paddle.

2. Shielding means for a rotary beater comprising a shaft having a cylindrical rotor supported thereon, and at least one row of crop engaging teeth disposed axially of said cylindrical rotor projecting outwardly therefrom, said means comprising an axially extending narrow shield bar removably attachable to said cylindrical rotor over said row of teeth, said bar being recessed to receive said teeth to prevent the crop from wrapping thereon and adapted to project outwardly of the cylindrical rotor to serve as a paddle thereon while exposing the majority of the surface of said cylinder.

3. Shielding means for a rotary beater comprising a cylinder having a supporting shaft therefor and a plurality of peripherally spaced axially extending rows of crop engaging teeth fixed on said cylinder, said means comprising axially extending shield bars removably attachable to said cylinder in peripherally spaced, radially projecting relation thereto, each of said bars being generally triangular in cross section and having recesses adapted to receive one of said rows of teeth.

4. Shielding means for a rotary beater having a row of crop engaging spikes projecting radially outwardly therefrom for use in certain crops, said means comprising a wooden shield bar of generally triangular cross section adapted to be removably attached to said beater and having longitudinally spaced recesses therein to receive said spikes to prevent wrapping when treating certain other crops and further serve as crop engageable paddles.

5. For use with a rotary beater comprising a cylinder having a supporting shaft therefor and a crop engaging spike projecting outwardly from said cylinder for use in certain crops, a shielding member for preventing wrapping of crops on said spike for use in certain other crops comprising a peripherally narrow block having a recess for receiving and embracing said spike while exposing the majority of the surface of said cylinder, and means for detachably fixing said block to said cylinder.

6. For use with a rotary beater comprising a cylinder having a supporting shaft and, at least one axially extending row of crop engaging teeth fixed on said cylinder, an axially extending narrow shield bar serving as a paddle while exposing most of the surface of said cylinder, said bar being recessed to receive said teeth, strap members straddling said bar, and securing bolts for detachably fixing said strap members to said cylinder.

7. For use with a rotary beater comprising a cylinder having a supporting shaft and, at least one axially extending row of crop engaging teeth fixed on said cylinder, an axially extending shield bar having longitudinally spaced holes therein for receiving said teeth, said bar being recessed to expose the outer ends of certain of said teeth, strap members straddling said bar at said recessed portions and having apertures for engaging said exposed ends of the teeth, and means for attaching said strap members to said cylinder.

BERYL WATSON.